United States Patent
Zhao et al.

(10) Patent No.: US 12,399,918 B1
(45) Date of Patent: Aug. 26, 2025

(54) CUSTOM EMBEDDING MODEL FOR SEMANTIC SEARCH

(71) Applicant: Camelot UK Bidco Limited, London (GB)

(72) Inventors: Chenyang Zhao, Fremont, CA (US);
Matthew Weber, Kalispell, MT (US);
Hongliang Liu, Menlo Park, CA (US);
Edward Robert Mulholland, Springdale, AR (US)

(73) Assignee: Camelot UK Bidco Limited, London (GB)

( * ) Notice: Subject to any disclaimer, the term of this patent is extended or adjusted under 35 U.S.C. 154(b) by 0 days.

(21) Appl. No.: 18/588,552

(22) Filed: Feb. 27, 2024

(51) Int. Cl.
*G06F 16/30* (2019.01)
*G06F 16/31* (2019.01)
*G06F 16/334* (2025.01)

(52) U.S. Cl.
CPC ........ G06F 16/316 (2019.01); G06F 16/3347 (2019.01)

(58) Field of Classification Search
CPC .................. G06F 16/316; G06F 16/3347
See application file for complete search history.

(56) References Cited

U.S. PATENT DOCUMENTS

| | | | | |
|---|---|---|---|---|
| 9,971,771 | B2 * | 5/2018 | Ryger | G06F 16/93 |
| 2020/0125673 | A1 * | 4/2020 | Aharonov | G06F 18/22 |
| 2024/0168984 | A1 * | 5/2024 | Kim | G06F 16/35 |

OTHER PUBLICATIONS

Wang et al., A Neural Corpus Indexer for Document Retrieval. Feb. 12, 2023 [retrieved on-line Nov. 29, 2024]. Retrieved from the Internet: https://doi.org/10.48550/arXiv.2206.02743 (Year: 2023).*

* cited by examiner

*Primary Examiner* — Kristopher Andersen
(74) *Attorney, Agent, or Firm* — Weaver IP L.L.C.

(57) ABSTRACT

System, methods, apparatuses, and computer program products are disclosed for generating a field-specific embedding model and employing the generated field-specific embedding model for semantic search of a field-specific database. A plurality of field-specific documents stored in a field-specific database are analyzed to determine a first document and a second document that are relevant to each other. A training dataset including a first training pair is generated by pairing a first portion of the first document with a corresponding second portion of the second document based on determining that the first document and second document are relevant to each other. A field-specific embedding model is trained based on the training dataset. The plurality of field-specific documents are provided to the field-specific embedding model to generate index embedding vectors. The field-specific database storing the plurality of field-specific documents is indexed based on the generated index embedding vectors.

20 Claims, 7 Drawing Sheets

CUSTOM EMBEDDING MODEL FOR SEMANTIC SEARCH

BACKGROUND

Embedding models represent words, phrases, sentences, and/or documents as vectors in a vector space where semantically similar items are closer together. These models can capture the semantic relationships between words, phrases, sentences, and/or documents, thereby enabling more accurate and/or effective retrieval of information.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

System, methods, apparatuses, and computer program products are disclosed for generating a field-specific embedding model and employing the generated field-specific embedding model for semantic search of a field-specific database. A plurality of field-specific documents stored in a field-specific database are analyzed to determine a first document and a second document that are relevant to each other. A training dataset including a first training pair is generated by pairing a first portion of the first document with a corresponding second portion of the second document based on determining that the first document and second document are relevant to each other. A field-specific embedding model is trained based on the training dataset. The plurality of field-specific documents of are provided to the field-specific embedding model to generate index embedding vectors. The field-specific database storing the plurality of field-specific documents is indexed based on the generated index embedding vectors.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
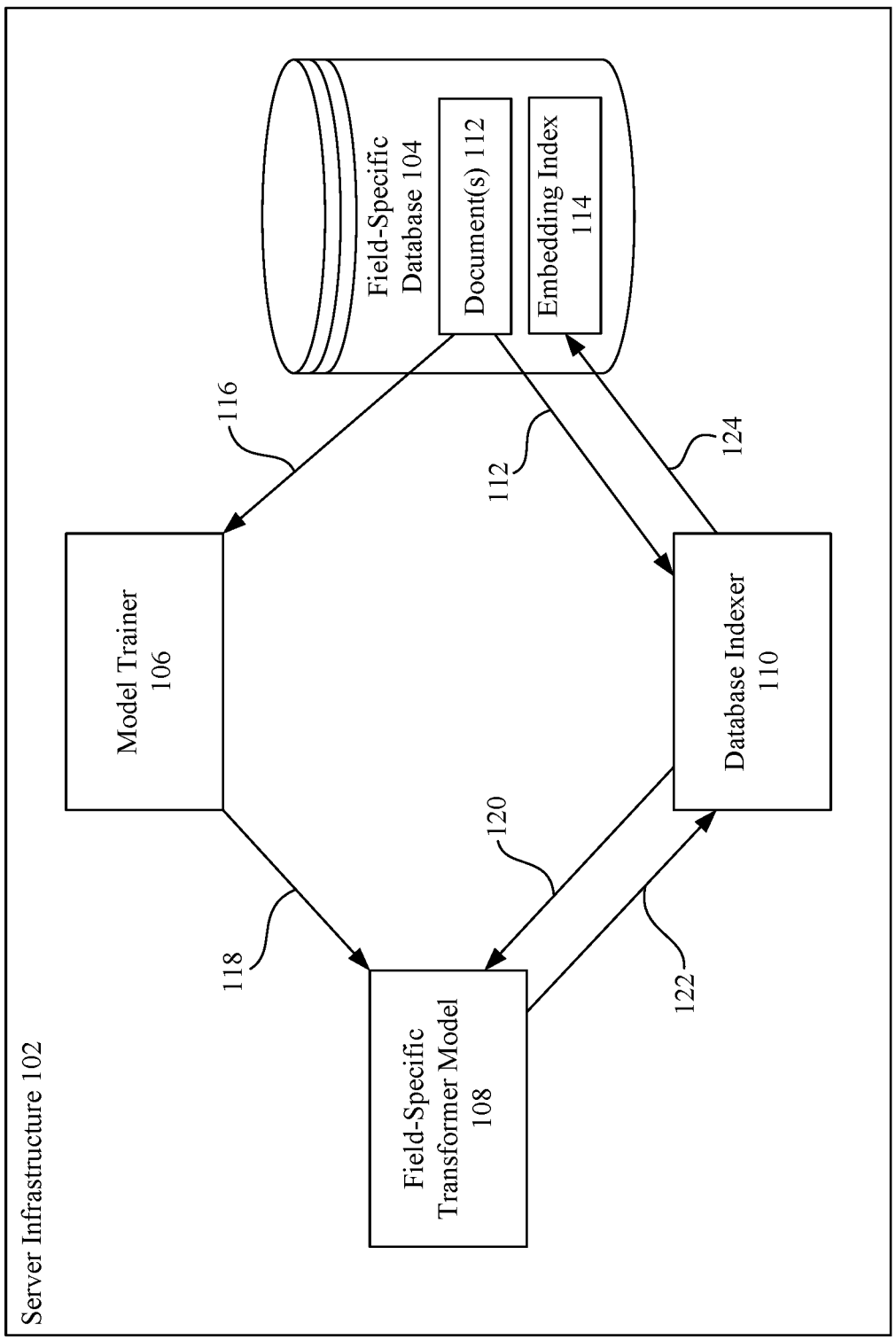
FIG. 1 shows a block diagram of an example system for training a field-specific transformer model and indexing a field-specific database using the trained field-specific transformer model, in accordance with an embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Embedding models may be generated through various techniques that aim to represent words, phrases, or documents as vectors in a vector space. Vectors generated by embedding models may represent text at various granularities, such as, words, pairs of words, triplets of words, phrases, sentences, documents, and/or the like. The training process involves optimizing the model parameters to minimize the distance between similar instances and maximize the distance between dissimilar ones. For word embeddings, methods, such as, but not limited to, Word2Vec, GloVe, and FastText, leverage neural networks to learn representations based on the context and co-occurrence of words in a large corpus. Sentence and document embeddings, such as, but not limited to, Universal Sentence Encoder and Doc2Vec, utilize neural network architectures to capture the semantic content of entire texts. Transformer-based models, such as, but not limited to, BERT, employ attention mechanisms to understand bidirectional context, generating contextual embeddings that reflect the relationships between words within a given context. Siamese and triplet networks, on the other hand, learn embeddings by emphasizing the similarity or dissimilarity between pairs or triplets of input data. These embedding models are created through the training of neural networks on diverse and extensive textual data, enabling them to capture semantic relationships and/or contextual nuances of general content. However, embedding models trained on diverse textual data may not accurately capture semantic relationships and/or contextual nuances of field-specific data.

Embodiments disclosed herein are directed to generating a custom field-specific embedding model based on field-specific data, indexing the field-specific data using index embedding vectors generated using the field-specific embedding model, and/or searching the field-specific data using a hybrid search technique that combines keyword searching and semantic searching. Because the custom field-specific embedding model is trained on field-specific data, the index embedding vectors generated by the field-specific embedding model more accurately capture the semantic relationships and/or contextual nuances of field-specific data.

In embodiments, a custom field-specific embedding model may be generated through various methods, such as, but not limited to training a neural network using a field-specific training dataset, and/or fine-tuning an existing embedding model using a field-specific training dataset. The field-specific training dataset may be generated by analyzing field-specific documents stored in a field-specific database to determine pairs or triplets of documents that are relevant to each other, and generating training pairs based on the determined pairs of documents. In embodiments, determining pairs of documents that are relevant to each other may be based on various factors, such as, but not limited to, classifications of the documents, citations of the documents (e.g., forward and/or backward citations), a relevancy score or metric, and/or any combination thereof. In embodiments, classifications of the documents may include, but are not limited to, a patent classification (e.g., U.S. Pat. Classification, Cooperative Patent Classification (CPC), etc.), and/or a journal classification (e.g., All Science Journal Classification (ASJC), Web of Science (WoS), Scopus, etc.).

In embodiments, a first document and a second document may be determined to be relevant to each other based on one or more of: a classification of the first document exactly matching a classification of the second document, the classification of the first document being a subclassification of the classification of the second document or vice versa, the classification of the first document and the classification of the second document sharing a common ancestor classification, and/or the like. In embodiments, a classification relevancy score or metric may be determined based on the degree of similarity between the classification of the first document and the classification of the second. For instance, an exact match between the classification of the first document and the classification of the second document may be associated with a higher classification relevancy score or metric than when the classification of the first document is a subclassification of the classification of the second document or vice versa. Similarly, a classification relevancy score or metric may be higher when the classification of the first document is a subclassification of the classification of the second document or vice versa than when the classification of the first document and the classification of the second document sharing a common ancestor classification.

In embodiments, a first document and a second document may be determined to be relevant to each other based on one or more of: the first document citing the second document or vice versa, the first document and the second document sharing a common forward and/or backward citation, the number of forward and/or backward citations in common between the first document and the second document, and/or the like. In embodiments, a citation relevancy score or metric may be determined based on the degree of degree of similarity between the citations of the first document and the citations of the second document. For instance, a citation relevancy score or metric may be higher when the first citation cites the second document or vice versa than when the first document and second document share a forward and/or backward citation. Similarly, the citation relevancy score or metric may vary based on the number of forward and/or backward citations shared by the first document and the second document.

In embodiments, training pairs may be generated based on any combination of the above criteria. For instance, when a first document and a second document have the same classification, and the first document cites the second document, a training pair may, in embodiments, be generated based on a first portion of the first document and a corresponding second portion of the second document. In other examples, a training pair may be generated when a classification relevancy score or metric and/or a citation relevancy score or metric satisfies a threshold condition, when a classification of a first document is a subclassification of a second document or vice versa, when a classification of a first document and a classification of a second document share a common ancestor classification, when the number of forward and/or backward citations shared by a first document and a second document satisfies a threshold condition, and/or any combination thereof.

In embodiments, training pairs may include a first portion of a first document, and a corresponding second portion of a second document determined to be similar to the first document. In embodiments, various portions of the field-specific documents may be employed to generate the training pairs of the field-specific training dataset, including, but not limited to, a title, an abstract, a claim, a conclusion, and/or any combination thereof. For instance, a training pair of the field-specific training dataset may, in embodiments, include an abstract of a first document and an abstract of a second document that is relevant to the first document. As another example, a training pair of the field-specific training dataset may, in embodiments, include a title of a first document and a title of a second document that is relevant to the first document. In embodiments, training pairs may further include a label indicating the degree of relevance between the first document and second document. For instance, a training pair may be labeled with a relevancy score or metric, such as, but not limited to, a classification relevancy score or metric, a citation relevancy score or metric, and/or a combined relevancy score or metric derived therefrom.

A custom field-specific embedding model may, in embodiments, be generated by fine-tuning an existing embedding model. For instance, a custom field-specific embedding model may be generated by training a pre-trained embedding model, such as, but not limited to, BERT, RoBERTa, and/or the like, using the training pairs in the field-specific training dataset. In embodiments, a custom field-specific embedding model may be generated by concatenating a pooling layer, and a dense or fully connected layer to a pre-trained embedding model. For instance, the custom field-specific embedding model may provide input to a pre-trained embedding model, pass the output from the pre-trained embedding model to a pooling layer to reduce and/or normalize the dimensionality of the output, and pass the output from the pooling layer to a dense layer that is trained on the field-specific training dataset.

The custom field-specific embedding model may, in embodiments, be trained using supervised or unsupervised machine learning techniques based on labeled or unlabeled field-specific training datasets, respectively. As discussed above, a field-specific training dataset may, in embodiments, be generated by pairing portions of a pair of documents that are determined to be relevant to each other. In embodiments, the field-specific training dataset may be labeled using with a relevancy score or metric indicative of a degree of relevance between the documents in the pair. The unlabeled and/or labeled field-specific training datasets may, in embodiments, be divided into a first subset training dataset for training and a second subset validation dataset for validation. For instance, a custom field-specific embedding model may, in embodiments, be trained by iteratively adjusting parameters of the layers of the custom field-specific embedding model to minimize a loss function, such as, but not limited to, a cosine similarity loss function, a multiple negative ranking loss function, a cosine sentence (CoSENT) loss function, a triplet loss function, a softmax loss function, and/or the like. The performance of the custom field-specific embedding model is then evaluated on the second subset validation dataset to assess its ability to accurately classify new or unseen data. In embodiments, a trained custom field-specific embedding model may be generated based on various machine learning algorithms, such as, but not limited to, Word2vec, Doc2vec, and/or the like.

Training of a custom field-specific embedding model may, in embodiments, continue until one or more termination criteria are satisfied. For instance, training of a custom field-specific embedding model may continue in iterations until one or more conditions are satisfied, such as, but not limited to, satisfaction of an accuracy threshold, satisfaction of a convergence threshold, and/or any combination thereof. Upon completion of training, a field-specific embedding model may be deployed into one or more servers of a server infrastructure to generate embedding vectors for field-specific documents.

In embodiments, a custom field-specific embedding model may be employed to index a field-specific database to improve searching of the field-specific database. In embodiments, portions of field-specific documents stored in a field-specific database may be provided to the custom field-specific embedding model to generate index embedding vectors that are representative of the portions of the field-specific documents. For instance, field-specific documents stored in a field-specific database may be parsed to extract a portion representative of the document, such as, but not limited to, the title, the abstract, a claim, a conclusion statement, and/or any combination thereof, and the extracted portion is provided to the custom field-specific embedding model to generate index embedding vectors. In embodiments, index embedding vectors generated by the custom field-specific embedding model are stored in an embedding index in association with the field-specific document used to generate the index embedding vector.

A field-specific database that is indexed based on index embedding vectors generated by a custom field-specific embedding model may, in embodiments, be searched using a hybrid search technique that combines a keyword search with a semantic search. In embodiments, field-specific documents stored in a field-specific database may be indexed based on the presence, frequency, relative frequency, and/or term frequency-inverse document frequency (TF-IDF) of keywords in the documents and/or portions thereof. Processing an incoming query against the field-specific database using keyword searching techniques may, in embodiments, return results that contain words in the search query with a high frequency, high relative frequency, and/or high TF-IDF. In embodiments, a keyword search of a field-specific database may further return keyword confidence scores indicative of the relevancy of the keyword search results to the incoming query. For instance, a keyword confidence score may be determined based on various factors, such as, but not limited to, the frequency, relative frequency, and/or TF-IDS of keywords, the placement of keywords within the document (e.g., in the title, in the abstract, etc.), and other contextual considerations.

Results of a keyword search of the field-specific database may, in embodiments, be combined with results from a sematic search performed based on a query embedding vector generated by a custom field-specific embedding model. For instance, an incoming query may be provided to a custom field-specific embedding model to generate a query embedding vector that is compared to index embedding vectors associated with documents in the field-specific database. In embodiments, documents associated with the identified index embedding vectors closest to the query embedding vector may be returned as search results in the semantic search. For instance, an approximate nearest neighbor (ANN) search may be performed by determining shortest distance (e.g., Euclidean distance, cosine similarity, etc.) between the query embedding vector and the nearest index embedding vector, and returning documents in the field-specific database associated with index embedding vectors within a predetermined distance from the query embedding vector that is based on the determined shortest distance to the nearest neighbor. For instance, an ANN search may return documents associated with index embedding vectors that are within n-times the shortest distance between the query embedding vector and the nearest index embedding vector, where n>1. In embodiments, a semantic search of a field-specific database may further return semantic confidence scores indicative of the relevancy of the semantic search results to the incoming query. For instance, a semantic confidence score may be determined based on various factors, such as, but not limited to, a distance between the query embedding vector and the search result and/or the like.

In embodiments, results from a keyword search and results from a semantic search may be combined using a ranking model based on keyword confidence scores and/or semantic confidence scores associated with the keyword search results and semantic search results, respectively. In embodiments, the ranking model may include a machine learning model trained to order a set of documents based on their relevance to a query by assigning a numerical score or rank to each document. For instance, the ranking model may assign a numerical score or rank to keyword search results and/or semantic search results based, respectively, on a keyword confidence score and/or semantic confidence score associated with the document. In embodiments, the ranking model may be trained based on historical data, and/or user interactions. For instance, the ranking model may, in embodiments, be trained based on user feedback on the relevancy of historical search results. In embodiments, output from the ranking model may include a ranked list of documents determined to be relevant to the search query. The highest ranking documents may, in embodiments, be retrieved from the field-specific database, and/or presented to a client via an interface.

These and further embodiments are disclosed herein that enable the functionality described above and additional functionality. Such embodiments are described in further detail as follows.

For instance, FIG. 1 depicts a block diagram of an example system 100 for training a field-specific transformer model and indexing a field-specific database using the trained field-specific transformer model, in accordance with an embodiment. As shown in FIG. 1, system 100 includes one or more server infrastructure 102 that include a field-specific database 104, a model trainer 106, a field-specific transformer model 108, and a database indexer 110. Additionally, field-specific database 104 includes one or more documents 112, and an embedding index 114. System 100 is described in further detail as follows.

Server infrastructure 102 may comprise a network-accessible server set (e.g., cloud-based environment or platform). In an embodiment, the underlying resources of server infrastructure 102 are co-located (e.g., housed in one or more nearby buildings with associated components such as backup power supplies, redundant data communications, environmental controls, etc.) to form a datacenter, are distributed across different regions, and/or are arranged in other manners. As shown in FIG. 1, server infrastructure 102 includes field-specific database 104, model trainer 106, field-specific transformer model 108, database indexer 110. Various example implementations of server infrastructure 102 are described below in reference to FIG. 9 (e.g., network-based server infrastructure 970, and/or components thereof).

Field-specific database 104 may comprise a collection of organized data related to a specific domain or field (e.g., patents, scientific journals, law journals, etc.), and may include, but is not limited to, document(s) 112. In embodiments, field-specific database 104 may further comprise an index, such as, but not limited to embedding index 114, to facilitate retrieval of document(s) 112.

Model trainer 106 may comprise a machine learning model trainer that is configured to fine-tune a pre-trained embedding model using a field-specific training dataset to generate a custom field-specific embedding model, such as, but not limited to, field-specific transformer model 108. In embodiments, model trainer 106 may automatically generate a field-specific training dataset based on portions of document(s) 112. Furthermore, model trainer 106 may, in embodiments, generate a custom field-specific embedding model by concatenating a pooling layer, and a dense layer to a pre-trained embedding model, such as, but not limited to, BERT, RoBERTa, and/or the like. In embodiments, model trainer 106 may train a custom field-specific embedding model by iteratively adjusting parameters of the layers of the custom field-specific embedding model to minimize a loss function, such as, but not limited to, a cosine similarity loss function, a multiple negative ranking loss function, a CoSENT loss function, a triplet loss function, a softmax loss function, and/or the like, and evaluating the custom field-specific embedding model on a second subset of the field-specific training dataset to assess its ability to accurately classify new or unseen data. Model trainer 106 may deploy a trained custom field-specific transformer model 118 to one or more servers of server infrastructure 102 as field-specific transformer model 108. Model trainer 106 will be described in greater detail in conjunction with FIG. 2 below.

Field-specific transformer model 108 may comprise a trained transformer model that is based on a pre-trained transformer model. For instance, field-specific transformer model 108 may, in embodiments, include a fine-tuned sentence or document transformer model, such as, but not limited to, BERT, RoBERTa, and/or the like, that is trained using a field-specific training dataset. Once deployed, field-specific training transformer model 108 is configured to accept a textual input (e.g., sentence, paragraph, title, abstract, document, query, etc.) and provide a vector output that accurately captures the semantic meaning of the textual input.

Database indexer 110 may be configured to retrieve document(s) 112 from field-specific database 104, provide portions 120 of document(s) 112 as textual input to field-specific transformer model 108, receive corresponding index embedding vectors 122 as vector output from field-specific transformer model 108, and index document(s) 112 in field-specific database 104 by storing, in embedding index 114, embedding index associations 124 that associate document(s) 112 with corresponding index embedding vectors 122. Database indexer 110 will be described in greater detail in conjunction with FIG. 2 below.

Document(s) 112 may comprise information related to a specific domain or field (e.g., patents, scientific journals, law journals, etc.). In embodiments, documents(s) 112 may include, but are not limited to, published documents (e.g., patents, articles, webpages, etc.), unpublished documents (e.g., internal documents, classified information, etc.), files, and/or the like.

Embedding index 114 may comprise a collection of embedding index associations 124 stored in association with the corresponding document(s) 112. In embodiments, embedding index 114 may enable semantic searching of field-specific database 104 based on embedding index associations 124. While embedding index 114 is depicted as part of field-specific database 104, in embodiments, embedding index 114 may be stored in a database separate and/or distinct from field-specific database 104. For instance, embedding index 114 may be stored in a separate vector database (not shown). Embedding index 114 will be described in greater detail in conjunction with FIG. 3 below.

Figure 2:
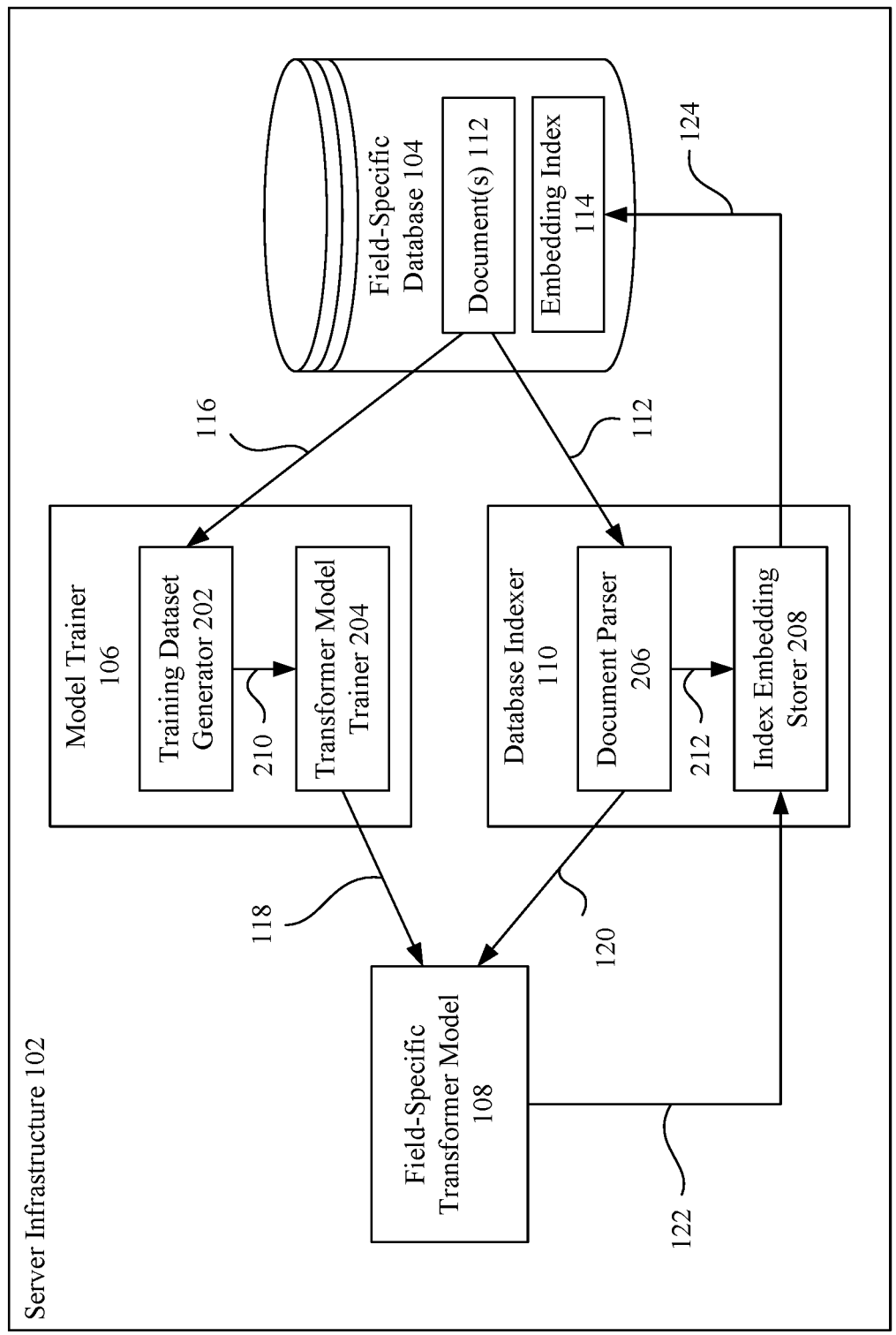
FIG. 2 depicts a block diagram of an example system for training a field-specific transformer model and indexing a field-specific database using the trained field-specific transformer model, in accordance with an embodiment.

Embodiments described herein may operate in various ways to train a field-specific transformer model and index a field-specific database using the trained field-specific transformer model. For example, FIG. 2 depicts a block diagram of an example system 200 for training a field-specific transformer model and indexing a field-specific database using the trained field-specific transformer model, in accordance with an embodiment. As shown in FIG. 2, system 200 includes server infrastructure 102, field-specific database 104, model trainer 106, field-specific transformer model 108, database indexer 110, document(s) 112, and embedding index 114. Additionally, in system 200, model trainer 106 further includes a training dataset generator 202, and a transformer model trainer 204. Moreover, in system 200, database indexer 110 further includes a document parser 206, and an index embedding storer 208. System 200 is described in further detail as follows.

Training dataset generator 202 may be configured to automatically generate a field-specific training dataset based on portions of document(s) 112. In embodiments, training dataset generator 202 may retrieve some or all of document(s) 112 as training documents 116, analyze training document 116 to determine pairs of documents that are relevant to each other, and generate a field-specific training dataset 210 by pairing a portion of a first document with a corresponding portion of a second document determined to be relevant to the first document. In embodiments, training dataset generator 202 may determine pairs of documents that are relevant to each other based on various factors, such as, but not limited to, classifications of the documents, citations of the documents (e.g., forward and/or backward citations), a relevancy score or metric, and/or any combination thereof. In embodiments, training dataset generator 202 may perform pre-processing on the portions of the pairs of documents, such as, but not limited to, stemming, lemmatization, stop word removal, text normalization, lowercasing, punctuation removal, tag removal, spell check/correct, and/or the like, prior to inclusion in the field-specific training dataset.

In embodiments, training dataset generator 202 may determine that a first document and a second document are relevant to each other based on one or more of: a classification of the first document exactly matching a classification of the second document, the classification of the first document being a subclassification of the classification of the second document or vice versa, the classification of the first document and the classification of the second document sharing a common ancestor classification, and/or the like. In embodiments, training dataset generator 202 may calculate a classification relevancy score or metric based on the degree of similarity between the classification of the first document and the classification of the second.

In embodiments, training dataset generator 202 may determine that a first document and a second document are relevant to each other based on one or more of: the first document citing the second document or vice versa, the first document and the second document sharing a common forward and/or backward citation, the number of forward and/or backward citations in common between the first document and the second document, and/or the like. In embodiments, training dataset generator 202 may calculate a citation relevancy score or metric may be determined based on the degree of degree of similarity between the citations of the first document and the citations of the second document.

In embodiments, training dataset generator 202 may generate training pairs may be generated based on any combination of the above criteria. For instance, when a first document and a second document have the same classification, and the first document cites the second document, a training pair may, in embodiments, be generated based on a first portion of the first document and a corresponding second portion of the second document. In other examples, a training pair may be generated when a classification relevancy score or metric and/or a citation relevancy score or metric satisfies a threshold condition, when a classification of a first document is a subclassification of a second document or vice versa, when a classification of a first document and a classification of a second document share a common ancestor classification, when the number of forward and/or backward citations shared by a first document and a second document satisfies a threshold condition, and/or any combination thereof.

In embodiments, training dataset generator 202 may generate training pairs by pairing a first portion of a first document, and a corresponding second portion of a second document determined to be similar to the first document. In embodiments, various portions of the field-specific documents may be employed to generate the training pairs of the field-specific training dataset, including, but not limited to, a title, an abstract, a claim, a conclusion, and/or any combination thereof. For instance, training dataset generator 202 may generate a training pair for field-specific training dataset 210 by pairing a title of a first document and a title of a second document that is relevant to the first document. As another example, training dataset generator 202 may generate a training pair for field-specific training dataset 210 by pairing an abstract of a first document and an abstract of a second document that is relevant to the first document. In embodiments, training dataset generator 202 may label training pairs with a label indicating the degree of relevance between the first document and second document. For instance, training dataset generator 202 may label a training pair with a relevancy score or metric, such as, but not limited to, a classification relevancy score or metric, a citation relevancy score or metric, and/or a combined relevancy score or metric derived therefrom.

Transformer model trainer 204 may be configured to train a custom field-specific embedding model by fine-tuning an existing embedding model, such as, but not limited to, BERT, RoBERTa, and/or the like, using the training pairs in field-specific training dataset 210. In embodiments, transformer model trainer 204 may generate a custom field-specific embedding model by concatenating a pooling layer, and a dense or fully connected layer to the pre-trained embedding model, and iteratively training the custom field-specific embedding model by adjusting parameters of the layers of the custom field-specific embedding model to minimize a loss function, such as, but not limited to, a cosine similarity loss function, a multiple negative ranking loss function, a CoSENT loss function, a triplet loss function, a softmax loss function, and/or the like. In embodiments, transformer model trainer 204 may train the custom field-specific embedding model using supervised or unsupervised machine learning techniques based on labeled or unlabeled field-specific training datasets, respectively. For instance, field-specific training dataset 210 may, in embodiments, be generated by pairing portions of a pair of documents that are determined to be relevant to each other. In embodiments, field-specific training dataset 210 may be labeled using with a relevancy score or metric indicative of a degree of relevance between the documents in the pair. In embodiments, transformer model trainer 204 may divide the unlabeled and/or labeled field-specific training dataset 210 into a first subset training dataset for training and a second subset validation dataset for validation, train the custom field-specific embedding model by iteratively adjusting parameters of the layers of the custom field-specific embedding model to minimize a loss function, such as, but not limited to, a cosine similarity loss function, a multiple negative ranking loss function, CoSENT loss function, a triplet loss function, a softmax loss function, and/or the like, and validate the custom field-specific embedding model using the second subset validation dataset. In embodiments, transformer model trainer 204 may train the custom field-specific embedding model until one or more termination criteria are satisfied, such as, but not limited to, satisfaction of an accuracy threshold, satisfaction of a convergence threshold, and/or any combination thereof. Upon completion of training, transformer model trainer 204 may deploy the trained field-specific embedding model 118 into one or more servers of server infrastructure 102 as field-specific transformer model 108.

Document parser 206 may be configured to retrieve document(s) 112 from field-specific database 104, parse document(s) 112 to extract portions 120 therefrom, and provide portions 120 to field-specific transformer model 108. For instance, document parser 206 may extract portions 120 from document(s) 112 that are representative of the content of document(s) 112, such as, but not limited to, a title, an abstract, a claim, a conclusion statement, and/or the like. In embodiments, document parser 206 may provide portions 120 of document(s) 112 to field-specific transformer model 108 to generate index embedding vectors 122 representative of the semantic meaning of portions 120 of document(s) 112. In embodiments, document parser 206 may further provide document identifiers 212 to index embedding storer 208 for association with index embedding vectors 122.

Index embedding storer 208 may be configured to receive document identifiers 212 from document parser 206 and corresponding index embedding vectors 122 from field-specific transformer model 108, generate embedding index associations 124 that associate document identifiers 212 with corresponding index embedding vectors 122, and store generated embedding index associations 124 in embedding index 114 of field-specific database 104.

Figure 3:
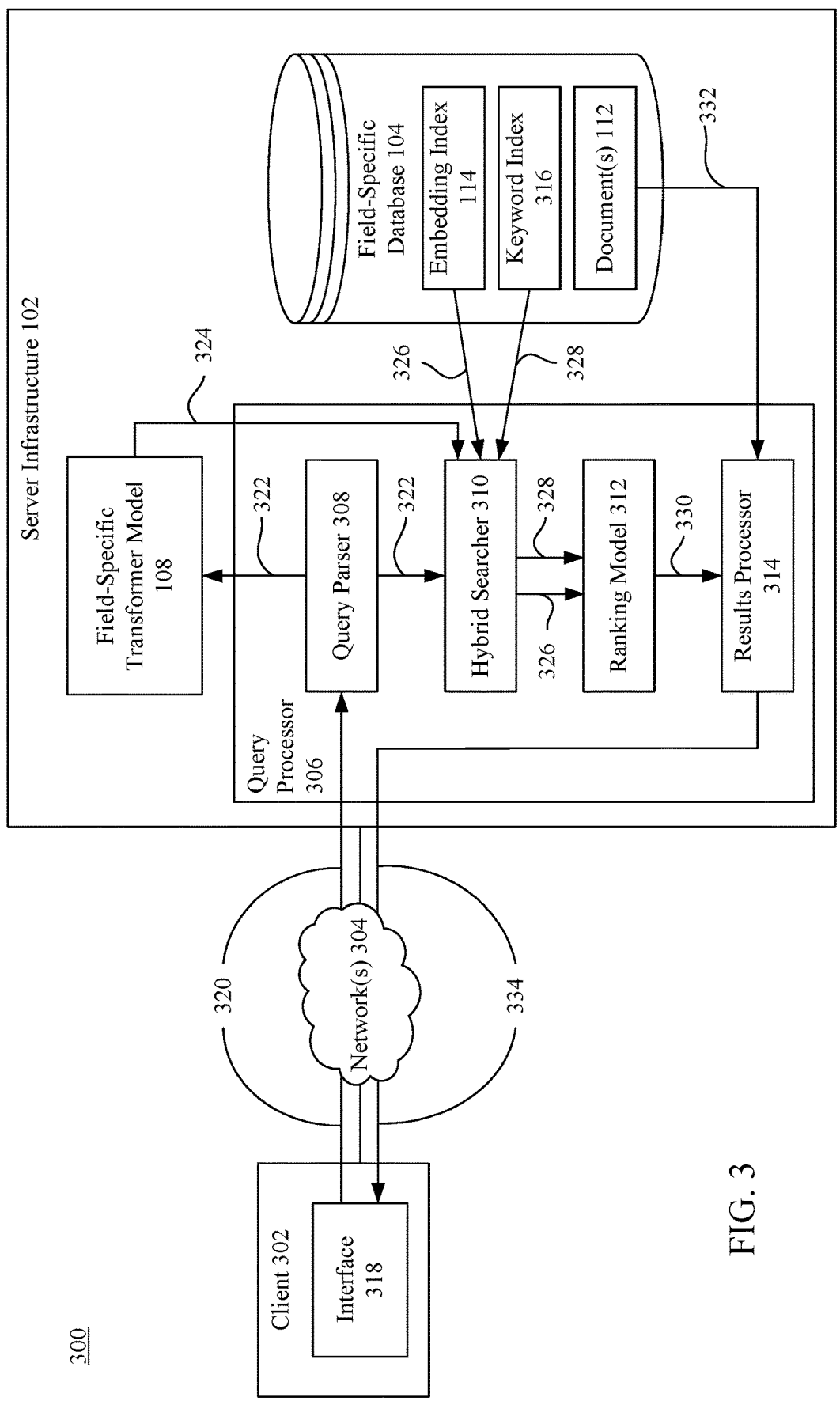
FIG. 3 depicts a block diagram of an example system for performing a hybrid search against a field-specific database that is indexed based on embeddings generated by a field-specific transformer model, in accordance with an embodiment.

Embodiments described herein may operate in various ways to perform a hybrid search against a field-specific database that is indexed based on embeddings generated by a field-specific transformer model. For example, FIG. 3 depicts a block diagram of an example system 300 for performing a hybrid search against a field-specific database that is indexed based on embeddings generated by a field-specific transformer model, in accordance with an embodiment. As shown in FIG. 3, system 300 includes server infrastructure 102, field-specific database 104, field-specific transformer model 108, document(s) 112, and embedding index 104. Additionally, system 300 includes a client 302 communicatively coupled to server infrastructure 102 via a network 304. Moreover, in system 300, server infrastructure 102 further includes a query processor 306 that includes a query parser 308, a hybrid searcher 310, a ranking model 312, and a results processor 314. Furthermore, in system 300, client 302 include an interface 318, and field-specific database 104 further includes a keyword index 316. System 300 is described in further detail as follows.

Client 302 may comprise any type of stationary or mobile processing device, including, but not limited to, a desktop computer, a server, a mobile or handheld device (e.g., a tablet, a personal data assistant (PDA), a smart phone, a laptop, etc.), an Internet-of-Things (IoT) device, etc. As shown in FIG. 3, client 302 includes interface 318. Various example implementations of client 302 are described below in reference to FIG. 9 (e.g., computing device 902, network-based server infrastructure 970, on-premises servers 992, and/or components thereof).

Network 304 may comprise one or more networks such as local area networks (LANs), wide area networks (WANs), enterprise networks, the Internet, etc., and may include one or more wired and/or wireless portions. In embodiments, network 304 may connect client 302 to server infrastructure 102 to enable communications between client 302 and server infrastructure 102. Various example implementations of network 304 are described below in reference to FIG. 9 (e.g., network 904, and/or components thereof).

Query processor 306 may be configured to receive a query 320 from client 302, perform a hybrid search on field-specific database 104 to determine one or more relevant documents 332, and provide search results 334 to client 302 that include relevant document(s) 332. As shown in FIG. 3, query processor 306 includes query parser 308, hybrid searcher 310, ranking model 312, and results processor 314.

Query parser 308 may be configured to receive a query 320 from client 302, extract query string 322 from query 320, and provide query string 322 to field-specific transformer model 108 and/or hybrid searcher 310. In embodiments, query parser 308 may perform pre-processing on query string 322, such as, but not limited to, stemming, lemmatization, stop word removal, text normalization, lowercasing, punctuation removal, tag removal, spell check/correct, and/or the like, prior to providing query string 322 to field-specific transformer model 108 and/or hybrid searcher 310.

Hybrid searcher 310 may be configured to receive query string 322 from query parser 308, and query embedding vector 324 from field-specific transformer model 108. In embodiments, query embedding vector 324 is generated by field-specific transformer model 108 based on query string 322, and is representative of the semantic meaning of query string 322. In embodiments, hybrid searcher 310 performs a semantic search of field-specific database 104 to determine semantic search results 326 that include document identifiers associated with index embedding vectors in embedding index 114 that are closest to query embedding vector 324. For instance, hybrid searcher 310 may, in embodiments, perform an approximate nearest neighbor (ANN) search by determining shortest distance (e.g., Euclidean distance, cosine similarity, etc.) between query embedding vector 324 and the nearest index embedding vector in embedding index 114, and determining document identifiers associated with index embedding vectors in embedding index 114 that are within a predetermined distance from the query embedding vector that is based on the determined shortest distance to the nearest neighbor. For instance, an ANN search may return documents associated with index embedding vectors that are within n-times the shortest distance between the query embedding vector and the nearest index embedding vector, where n>1. In embodiments, semantic search results 326 may further include semantic confidence scores indicative of the relevancy of semantic search results 326 to query string 322.

In embodiments, hybrid searcher 310 may perform a keyword search of field-specific database 104 to determine, based on keyword index 316, keyword search results 328 that include document identifiers associated with documents having a high frequency, high relative frequency, and/or high TF-IDF of keywords in query string 322. In embodiments, keyword search results 328 may further include keyword confidence scores indicative of the relevancy of the keyword search results to the incoming query. For instance, a keyword confidence score may be determined based on various factors, such as, but not limited to, the frequency, relative frequency, and/or TF-IDS of keywords, the placement of keywords within the document (e.g., in the title, in the abstract, etc.), and other contextual considerations.

Ranking model 312 may comprise a machine learning model trained to order a set of documents based on their relevance to a query by assigning a numerical score or rank to each document. For instance, ranking model 312 may combine keyword search results 328 from a keyword search and semantic search results 326 from a semantic search based on keyword confidence scores and/or semantic confidence scores associated with the keyword search results and semantic search results, respectively, to generate combined results 330. In embodiments, ranking model 312 may assign a numerical score or rank to semantic search results 326 and/or keyword search results 328 based on the keyword confidence score and/or the semantic confidence score, respectively. In embodiments, ranking model 312 may be trained based on historical data, and/or user interactions. For instance, ranking model 312 may, in embodiments, be trained based on user feedback on the relevancy of historical search results. In embodiments, ranking model 312 may output combined results 330 as a ranked list of document identifiers.

Results processor 314 may receive combined results 330 as a ranked list of document identifiers, retrieve relevant document(s) 332 from field-specific database 104 based on combined results 330, and provide search results 334 to client 302 based on relevant document(s) 332. In embodiments, results processor 314 may generate search results 334 by including one or more interface elements, such as, but not limited to, a ranked list of relevant document(s) 332, a sortable list of relevant document(s) 332, a summary of relevant document(s) 332, an excerpt (e.g., title, abstract, often-quoted portion, etc.) of relevant document(s) 332, a hyperlink linking to relevant document(s) 332, and/or the like. Results processor 314 may provide search results 334 to client 302 for output via interface 318.

Keyword index 316 may store the presence, frequency, relative frequency, and/or term frequency-inverse document frequency (TF-IDF) of keywords in document(s) 112 and/or portions thereof, in association with document identifiers associated with document(s) 112. While keyword index 316 is depicted as part of field-specific database 104, in embodiments, keyword index 316 may be stored in a database separate and/or distinct from field-specific database 104.

Interface 318 may comprise an interface that enables a user and/or program of client 302 to interact with query processor 306 to search field-specific database 104. In embodiments, interface 318 may include, but is not limited to, a graphical user interface (GUI), a voice interface, a chatbot interface, a chat interface, a digital assistant, a command line interface (CLI), an application programming interface (API), and/or the like. In embodiments, interface 318 may accept a search query in various modalities, such as, but not limited to, keyboard input, voice input, pointer input, touch-based input, and/or the like, and generate a query 320 based on thereon. In embodiments, interface 318 may receive search results 334 from query processor 306 and format search results 334 in an appropriate format and/or modality for output to a user.

Figure 4:
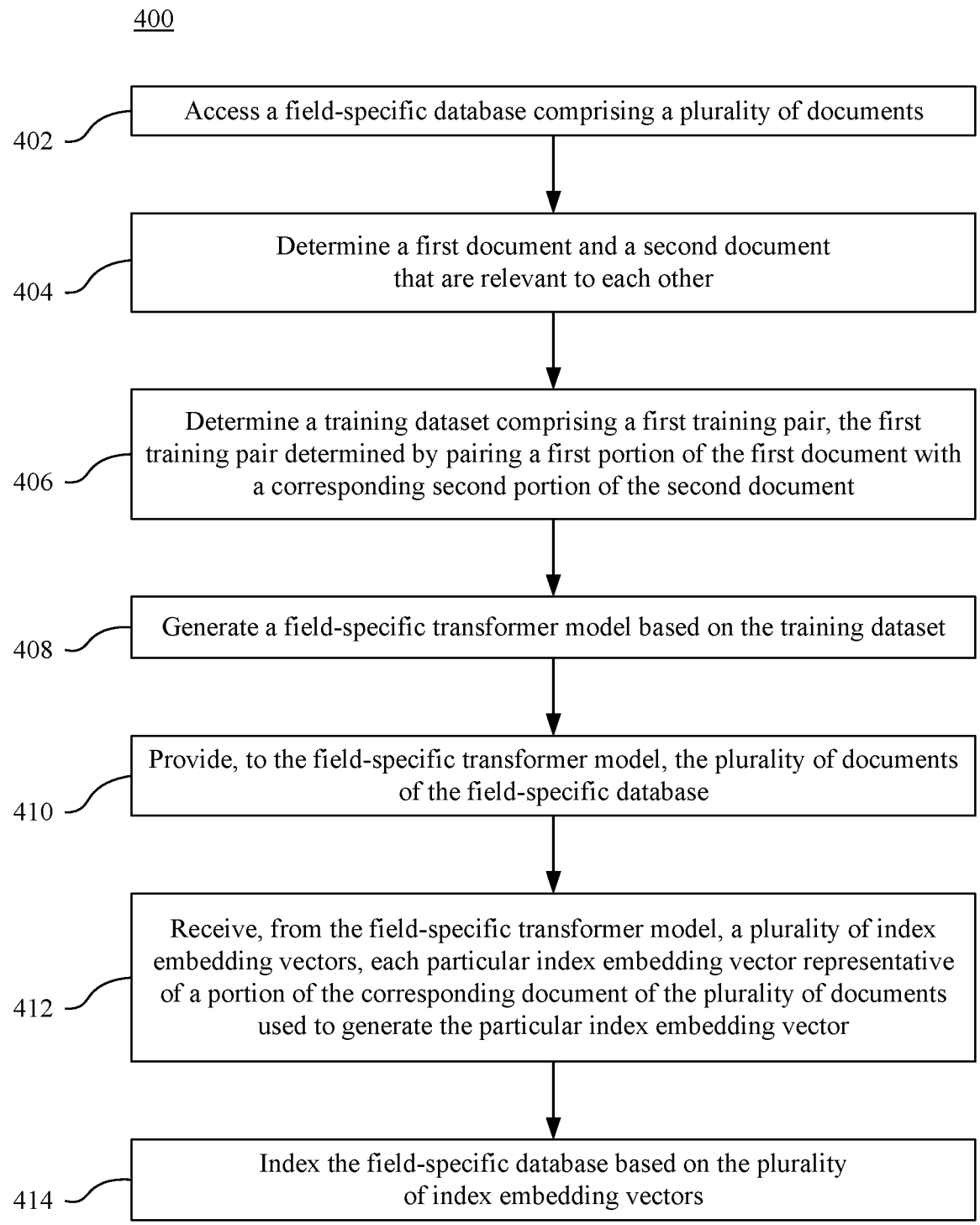
FIG. 4 depicts a flowchart of a process for training a field-specific transformer model and indexing a field-specific database using the trained field-specific transformer model, in accordance with an embodiment.

Embodiments described herein may operate in various ways to train a field-specific transformer model and index a field-specific database using the trained field-specific transformer model. FIG. 4 depicts a flowchart 400 of a process for training a field-specific transformer model and indexing a field-specific database using the trained field-specific transformer model, in accordance with an embodiment. Server infrastructure 102, field-specific database 104, model trainer 106, field-specific transformer model 108, database indexer 110, document(s) 112, embedding index 114, training dataset generator 202, transformer model trainer 204, document parser 206, and/or index embedding storer 208 of FIGS. 1-2 may operate in accordance with flowchart 400. Note that not all steps of flowchart 400 may need to be performed in all embodiments, and in some embodiments, the steps of flowchart 400 may be performed in different orders than shown. Flowchart 400 is described as follows with respect to FIGS. 1-2 for illustrative purposes.

Flowchart 400 starts at step 402. In step 402, a field-specific database comprising a plurality of documents is accessed. For example, training dataset generator 202 of model trainer 106 may access field-specific database 104 to retrieve training documents 116 therefrom. In embodiments, training documents 116 may include some or all of document(s) 112 stored in field-specific database 104.

In step 404, a first document and a second document are determined to be relevant to each other. For example, training dataset generator 202 of model trainer 106 may analyze training document 116 to determine pairs of documents that are relevant to each other. In embodiments, training dataset generator 202 may determine that a first document and a second document are relevant to each other based on one or more of: a classification of the first document exactly matching a classification of the second document, the classification of the first document being a subclassification of the classification of the second document or vice versa, the classification of the first document and the classification of the second document sharing a common ancestor classification, the first document citing the second document or vice versa, the first document and the second document sharing a common forward and/or backward citation, the number of forward and/or backward citations in common between the first document and the second document, and/or any combination thereof.

In step 406, a training dataset comprising a first training pair, the first training pair is determined by pairing a first portion of the first document with a corresponding second portion of the second document. For example, training dataset generator 202 of model trainer 106 may generate a training pair of field-specific training dataset 210 based on a first portion of the first document and a corresponding second portion of the second document. For instance, training dataset generator 202 may generate a training pair by pairing a first portion of a first document, and a corresponding second portion of a second document determined to be similar to the first document. In embodiments, various portions of the field-specific documents may be employed to generate the training pairs of the field-specific training dataset, including, but not limited to, a title, an abstract, a claim, a conclusion, and/or any combination thereof. In embodiments, training dataset generator 202 may label the training pair with a label indicating the degree of relevance between the first document and second document. For instance, training dataset generator 202 may label a training pair with a relevancy score or metric, such as, but not limited to, a classification relevancy score or metric, a citation relevancy score or metric, and/or a combined relevancy score or metric derived therefrom.

In step 408, a field-specific transformer model is generated based on the training dataset. For example, transformer model trainer 204 of model trainer 106 may be configured to generate field-specific transformer model 108 based on field-specific training dataset 210. In embodiments, transformer model trainer 204 generates filed-specific transformer model 108 by fine-tuning an existing embedding model, such as, but not limited to, BERT, RoBERTa, and/or the like, using the training pairs in field-specific training dataset 210. In embodiments, transformer model trainer 204 may generate a custom field-specific embedding model by concatenating a pooling layer, and a dense or fully connected layer to the pre-trained embedding model, and iteratively training the custom field-specific embedding model by adjusting parameters of the layers of the custom field-specific embedding model to minimize a loss function, such as, but not limited to, a cosine similarity loss function, a multiple negative ranking loss function, a CoSENT loss function, a triplet loss function, a softmax loss function, and/or the like. In embodiments, transformer model trainer 204 may train the custom field-specific embedding model until one or more termination criteria are satisfied, such as, but not limited to, satisfaction of an accuracy threshold, satisfaction of a convergence threshold, and/or any combination thereof. Upon completion of training, transformer model trainer 204 may deploy the trained field-specific embedding model 118 into one or more servers of server infrastructure 102 as field-specific transformer model 108.

In step 410, the plurality of documents of the field-specific database are provided to the field-specific transformer model. For example, document parser 206 may extract portions 120 from document(s) 112, and provide extracted portions 120 from document(s) 112 to field-specific transformer model 108. In embodiments, portions 120 of document(s) 112 may include portions that are representative of the content of document(s) 112, such as, but not limited to, a title, an abstract, a claim, a conclusion statement, and/or any combination thereof.

In step 412, a plurality of index embedding vectors are received from the field-specific transformer model, each particular index embedding vector representative of a portion of the corresponding document of the plurality of documents used to generate the particular index embedding vector. For example, document parser 206 may receive, from field-specific transformer model 108, index embedding vectors 122 representative of the semantic meaning of portions 120 of document(s) 112.

In step 414, the field-specific database is indexed based on the plurality of index embedding vectors. For example, index embedding storer 208 may generate embedding index associations 124 that associate index embedding vectors 122 received from field-specific transformer model 108 with corresponding document identifiers 212 received from document parser 206, and store generated embedding index associations 124 in embedding index 114 of field-specific database 104.

Figure 5:
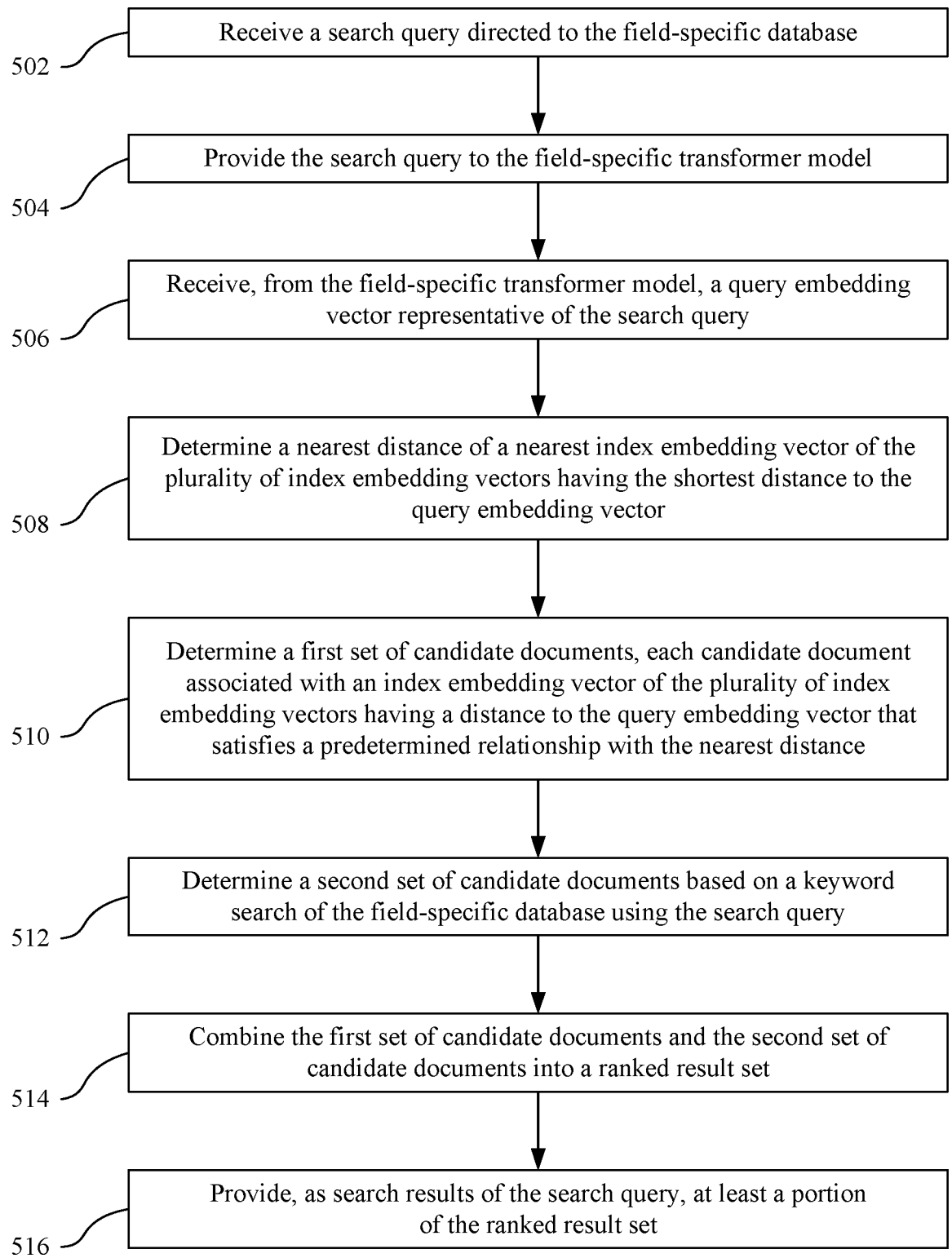
FIG. 5 depicts a flowchart of a process for performing a hybrid search against a field-specific database that is indexed based on embeddings generated by a field-specific transformer model, in accordance with an embodiment.

Embodiments described herein may operate in various ways to perform a hybrid search against a field-specific database that is indexed based on embeddings generated by a field-specific transformer model. FIG. 5 depicts a flowchart 500 of a process for performing a hybrid search against a field-specific database that is indexed based on embeddings generated by a field-specific transformer model, in accordance with an embodiment. Server infrastructure 102, field-specific database 104, field-specific transformer model 108, query processor 306, query parser 308, hybrid searcher 310, ranking model 312, and/or results processor 314 of FIGS. 1-3 may operate in accordance with flowchart 500. Note that not all steps of flowchart 500 may need to be performed in all embodiments, and in some embodiments, the steps of flowchart 500 may be performed in different orders than shown. Flowchart 500 is described as follows with respect to FIGS. 1-3 for illustrative purposes.

Flowchart 500 starts at step 502. In step 502, a search query directed to the field-specific database is received. For example, query parser 308 of query processor 306 may receive a query 320 from client 302 and/or extract query string 322 therefrom.

In step 504, the query is provided to a field-specific transformer model. For example, query parser 308 provides query string 322 to field-specific transformer model 108. In embodiments, query parser 308 may perform pre-processing on query string 322, such as, but not limited to, stemming, lemmatization, stop word removal, text normalization, lowercasing, punctuation removal, tag removal, spell check/correct, and/or the like, prior to providing query string 322 to field-specific transformer model 108.

In step 506, a query embedding vector representative of the search query is received from the field-specific transformer model. For example, hybrid searcher 310 may receive query embedding vector 324 from field-specific transformer model 108. In embodiments, query embedding vector 324 is generated by field-specific transformer model 108 based on query string 322, and is representative of the semantic meaning of query string 322.

In step 508, a nearest distance of a nearest index embedding vector of the plurality of index embedding vectors is determined, the nearest index embedding vector having the shortest distance to the query embedding vector. For example, hybrid searcher 310 may determine a shortest distance (e.g., Euclidean distance, cosine similarity, etc.) between query embedding vector 324 and the nearest index embedding vector in embedding index 114.

In step 510, a first set of candidate documents is determined, each candidate document associated with an index embedding vector of the plurality of index embedding vectors having a distance to the query embedding vector that satisfies a predetermined relationship with the nearest distance. For example, hybrid searcher 310 may determine semantic search results 326 that include document identifiers associated with index embedding vectors in embedding index 114 that are within a predetermined distance from the query embedding vector that is based on the determined shortest distance to the nearest index embedding vector. For instance, semantic search results 326 may include documents associated with index embedding vectors that are within n-times the shortest distance between the query embedding vector and the nearest index embedding vector, where n>1. In embodiments, semantic search results 326 may further include semantic confidence scores indicative of the relevancy of semantic search results 326 to query string 322.

In step 512, a second set of candidate documents are determined based on a keyword search of the field-specific database using the search query. For example, hybrid searcher 310 may perform a keyword search of field-specific database 104 to determine, based on keyword index 316, keyword search results 328 that include document identifiers associated with documents having a high frequency, high relative frequency, and/or high TF-IDF of keywords in query string 322. In embodiments, keyword search results 328 may further include keyword confidence scores indicative of the relevancy of the keyword search results to the incoming query. For instance, a keyword confidence score may be determined based on various factors, such as, but not limited to, the frequency, relative frequency, and/or TF-IDS of keywords, the placement of keywords within the document (e.g., in the title, in the abstract, etc.), and other contextual considerations.

In step 514, the first set of candidate documents and the second set of candidate documents are combined into a ranked result set. For example, hybrid searcher 310 provides semantic search results 326 and keyword search results 328 to ranking model 312 to generate combined results 330. In embodiments, ranking model 312 may output combined results 330 as a ranked list of document identifiers.

In step 516, at least a portion of the ranked result set is provided as search results of the search query. For example, results processor 314 may receive combined results 330 as a ranked list of document identifiers, retrieve relevant document(s) 332 from field-specific database 104 based on combined results 330, and provide search results 334 to client 302 based on relevant document(s) 332. In embodiments, results processor 314 may generate search results 334 by including one or more interface elements, such as, but not limited to, a ranked list of relevant document(s) 332, a sortable list of relevant document(s) 332, a summary of relevant document(s) 332, an excerpt (e.g., title, abstract, often-quoted portion, etc.) of relevant document(s) 332, a hyperlink linking to relevant document(s) 332, and/or the like. Results processor 314 may provide search results 334 to client 302 for output via interface 318.

Figure 6:
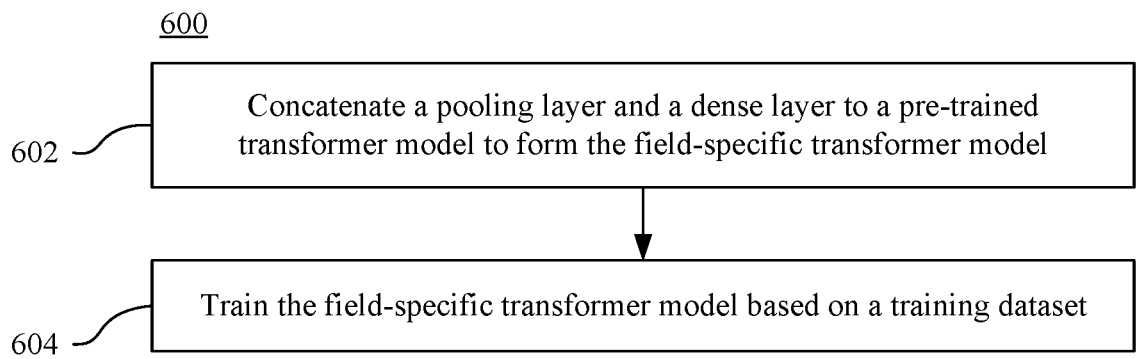
FIG. 6 depicts a flowchart of a process for generating a field-specific transformer model, in accordance with an embodiment.

Embodiments described herein may operate in various ways to generate a field-specific transformer model. FIG. 6 depicts a flowchart 600 of a process for generating a field-specific transformer model, in accordance with an embodiment. Server infrastructure 102, field-specific database 104, model trainer 106, field-specific transformer model 108, document(s) 112, embedding index 114, training dataset generator 202, and/or transformer model trainer 204 of FIGS. 1-2 may operate in accordance with flowchart 600. Flowchart 600 is described as follows with respect to FIGS. 1-2 for illustrative purposes.

Flowchart 600 starts at step 602. In step 602, a pooling layer and a dense layer are concatenated to a pre-trained transformer model to form a field-specific transformer model. For example, transformer model trainer 204 of model trainer 106 may generate a custom field-specific embedding model by concatenating a pooling layer, and a dense layer to a pre-trained embedding model.

In step 604, the field-specific transformer model is trained based on a training pair. For instance, transformer model trainer 204 may iteratively train the custom field-specific embedding model by adjusting parameters of the layers of the custom field-specific embedding model to minimize a loss function, such as, but not limited to, a cosine similarity loss function, a multiple negative ranking loss function, a CoSENT loss function, a triplet loss function, a softmax loss function, and/or the like. In embodiments, transformer model trainer 204 may train the custom field-specific embedding model until one or more termination criteria are satisfied, such as, but not limited to, satisfaction of an accuracy threshold, satisfaction of a convergence threshold, and/or any combination thereof. Upon completion of training, transformer model trainer 204 may deploy the trained field-specific embedding model 118 into one or more servers of server infrastructure 102 as field-specific transformer model 108.

Figure 7:
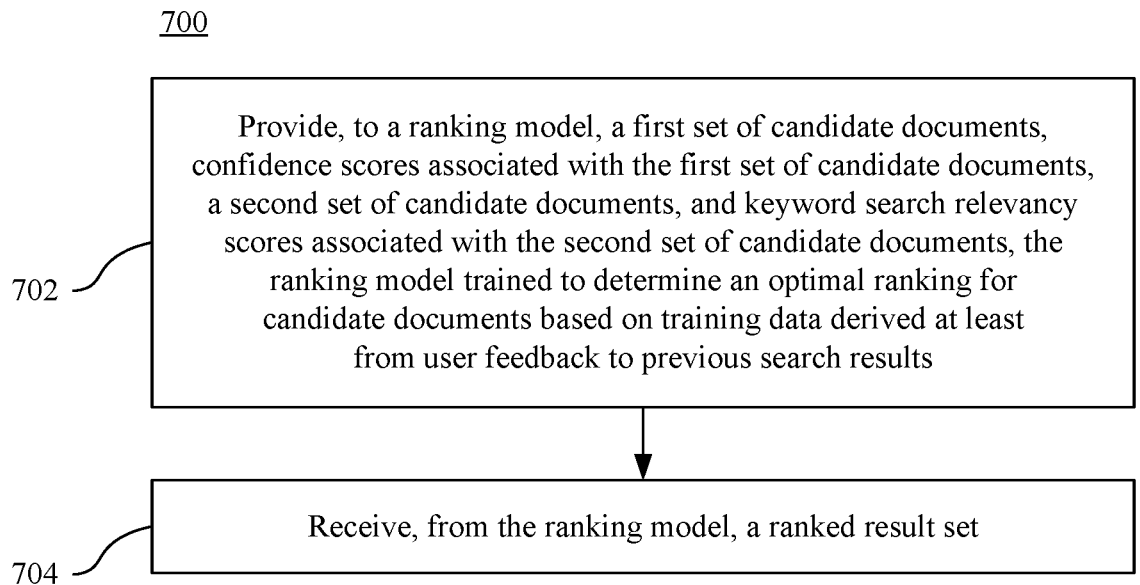
FIG. 7 depicts a flowchart of a process for combining sets of search results into a ranked result set using a ranking model, in accordance with an embodiment.

Embodiments described herein may operate in various ways to combine sets of search results into a ranked result set using a ranking model. For example, FIG. 7 depicts a flowchart 700 of a process for combining sets of search results into a ranked result set using a ranking model, in accordance with an embodiment. Server infrastructure 102, field-specific database 104, field-specific transformer model 108, query processor 306, query parser 308, hybrid searcher 310, ranking model 312, and/or results processor 314 of FIGS. 1-3 may operate in accordance with flowchart 700. Flowchart 700 is described as follows with respect to FIGS. 1-3 for illustrative purposes.

Flowchart 700 starts at step 702. In step 702, a first set of candidate documents, confidence scores associated with the first set of candidate documents, a second set of candidate documents, and keyword search relevancy scores associated with the second set of candidate documents are provided to a ranking model, the ranking model trained to determine an optimal ranking for candidate documents based on training data derived at least from user feedback to previous search results. For example, hybrid searcher 310 may provide semantic search results 326 and keyword search results 328 to ranking model 312. In embodiments, semantic search results 326 may further include semantic confidence scores indicative of the relevancy of semantic search results 326 to query string 322, and keyword search results 328 may further include keyword confidence scores indicative of the relevancy of the keyword search results to the incoming query.

In step 704, a ranked result set is received from the ranking model. For example, results processor 314 may receive from ranking model 312, ranked result set 328. For example, results processor 314 may receive, from ranking model 312, combined results 330 as a ranked list of document identifiers.

Figure 8:
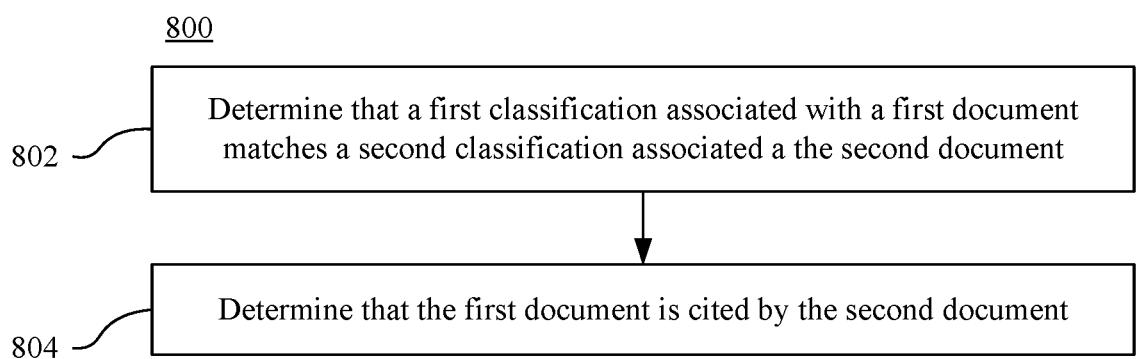
FIG. 8 depicts a flowchart of a process for determining a first document and a second document that are related to each other, in accordance with an embodiment.

Embodiments described herein may operate in various ways to determine a first document and a second document that are related to each other. FIG. 8 depicts a flowchart 800 of a process for determining a first document and a second document that are related to each other, in accordance with an embodiment. Server infrastructure 102, field-specific database 104, model trainer 106, field-specific transformer model 108, document(s) 112, embedding index 114, training dataset generator 202, and/or transformer model trainer 204 of FIGS. 1-2 may operate in accordance with flowchart 800. Note that in some embodiments, the steps of flowchart 800 may be performed in different orders than shown. Flowchart 800 is described as follows with respect to FIGS. 1-2 for illustrative purposes.

Flowchart 800 starts at step 802. In step 802, a first classification associated with a first document is determined to match a second classification associated with a second document. For example, training dataset generator 202 may determine that a first classification associated with a first document matches a second classification associated with a second document. In embodiments, a first classification associated with a first document may match a second classification associated with a second document when the first classification exactly matches the second classification, the first classification is a subclassification of the second classification or vice versa, the first classification and the second classification share a common ancestor classification, and/or the like.

In step 804, the first document is determined to have been cited by the second document. For example, training dataset generator 202 may determine that a first document is cited by a second document. In embodiments, training dataset generator 202 may determine that a first document is cited by a second document by analyzing the second document, and/or metadata associated therewith, to determine whether the first document is included therein as a forward citation, and/or by analyzing the first document, and/or metadata associated therewith, to determine whether the second document is included therein as a backward citation.

III. Example Mobile Device and Computer System Implementation

The systems and methods described above in reference to FIGS. 1-8, including server infrastructure 102, field-specific database 104, model trainer 106, field-specific transformer model 108, database indexer 110, document(s) 112, embedding index 114, training dataset generator 202, transformer model trainer 204, document parser 206, index embedding storer 208, client 302, network 304, query processor 306, query parser 308, hybrid searcher 310, ranking model 312, results processor 314, keyword index 316, interface 318, and/or each of the components described therein, and/or the steps of flowcharts 400, 500, 600, 700, and/or 800 may be implemented in hardware, or hardware combined with one or both of software and/or firmware. For example, server infrastructure 102, field-specific database 104, model trainer 106, field-specific transformer model 108, database indexer 110, document(s) 112, embedding index 114, training dataset generator 202, transformer model trainer 204, document parser 206, index embedding storer 208, client 302, network 304, query processor 306, query parser 308, hybrid searcher 310, ranking model 312, results processor 314, keyword index 316, interface 318, and/or each of the components described therein, and/or the steps of flowcharts 400, 500, 600, 700, and/or 800 may be each implemented as computer program code/instructions configured to be executed in one or more processors and stored in a computer readable storage medium. Alternatively, server infrastructure 102, field-specific database 104, model trainer 106, field-specific transformer model 108, database indexer 110, document(s) 112, embedding index 114, training dataset generator 202, transformer model trainer 204, document parser 206, index embedding storer 208, client 302, network 304, query processor 306, query parser 308, hybrid searcher 310, ranking model 312, results processor 314, keyword index 316, interface 318, and/or each of the components described therein, and/or the steps of flowcharts 400, 500, 600, 700, and/or 800 may be each implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 9:
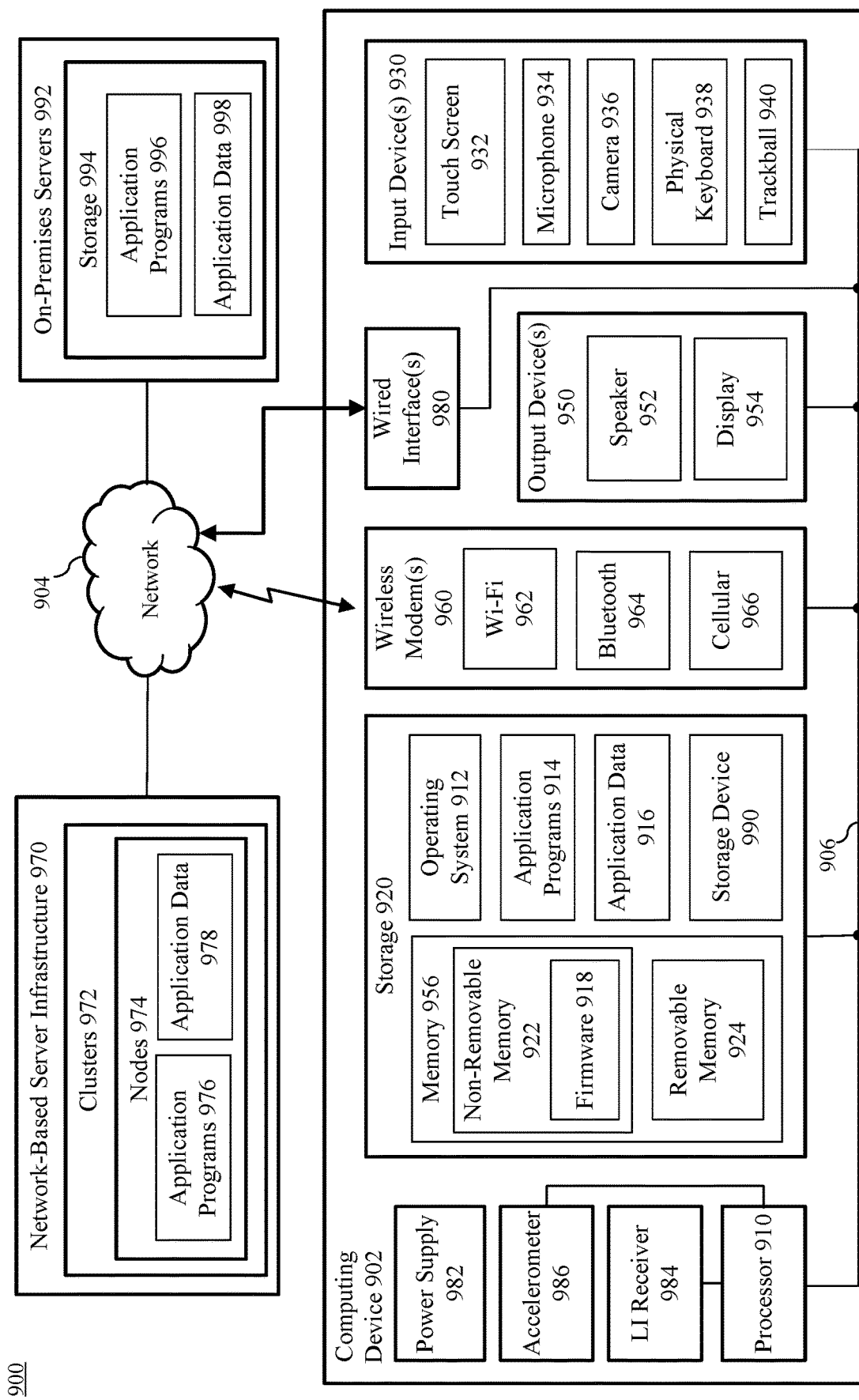
FIG. 9 shows a block diagram of an example computer system in which embodiments may be implemented.

Embodiments disclosed herein may be implemented in one or more computing devices that may be mobile (a mobile device) and/or stationary (a stationary device) and may include any combination of the features of such mobile and stationary computing devices. Examples of computing devices in which embodiments may be implemented are described as follows with respect to FIG. 9. FIG. 9 shows a block diagram of an exemplary computing environment 900 that includes a computing device 902. Computing device 902 is an example of client 302 shown in FIG. 3, which may each include one or more of the components of computing device 902. In some embodiments, computing device 902 is communicatively coupled with devices (not shown in FIG. 9) external to computing environment 900 via network 904. Network 904 comprises one or more networks such as local area networks (LANs), wide area networks (WANs), enterprise networks, the Internet, etc., and may include one or more wired and/or wireless portions. Network 904 may additionally or alternatively include a cellular network for cellular communications. Computing device 902 is described in detail as follows.

Computing device 902 can be any of a variety of types of computing devices. For example, computing device 902 may be a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. Computing device 902 may alternatively be a stationary computing device such as a desktop computer, a personal computer (PC), a stationary server device, a minicomputer, a mainframe, a supercomputer, etc.

As shown in FIG. 9, computing device 902 includes a variety of hardware and software components, including a processor 910, a storage 920, one or more input devices 950, one or more output devices 950, one or more wireless modems f), one or more wired interfaces 960, a power supply 962, a location information (LI) receiver 964, and an accelerometer 966. Storage 920 includes memory 956, which includes non-removable memory 922 and removable memory 924, and a storage device 990. Storage 920 also stores an operating system 912, application programs 914, and application data 916. Wireless modem(s) 960 include a Wi-Fi modem 962, a Bluetooth modem 964, and a cellular modem 966. Output device(s) 950 includes a speaker 952 and a display 954. Input device(s) 950 includes a touch screen 952, a microphone 954, a camera 956, a physical keyboard 958, and a trackball 940. Not all components of computing device 902 shown in FIG. 9 are present in all embodiments, additional components not shown may be present, and any combination of the components may be present in a particular embodiment. These components of computing device 902 are described as follows.

A single processor 910 (e.g., central processing unit (CPU), microcontroller, a microprocessor, signal processor, ASIC (application specific integrated circuit), and/or other physical hardware processor circuit) or multiple processors 910 may be present in computing device 902 for performing such tasks as program execution, signal coding, data processing, input/output processing, power control, and/or other functions. Processor 910 may be a single-core or multi-core processor, and each processor core may be single-threaded or multithreaded (to provide multiple threads of execution concurrently). Processor 910 is configured to execute program code stored in a computer readable medium, such as program code of operating system 912 and application programs 914 stored in storage 920. The program code is structured to cause processor 910 to perform operations, including the processes/methods disclosed herein. Operating system 912 controls the allocation and usage of the components of computing device 902 and provides support for one or more application programs 914 (also referred to as "applications" or "apps"). Application programs 914 may include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. Processor(s) 910 may include one or more general processors (e.g., CPUs) configured with or coupled to one or more hardware accelerators, such as one or more NPUs and/or one or more GPUs.

Any component in computing device 902 can communicate with any other component according to function, although not all connections are shown for ease of illustration. For instance, as shown in FIG. 9, bus 906 is a multiple signal line communication medium (e.g., conductive traces in silicon, metal traces along a motherboard, wires, etc.) that may be present to communicatively couple processor 910 to various other components of computing device 902, although in other embodiments, an alternative bus, further buses, and/or one or more individual signal lines may be present to communicatively couple components. Bus 906 represents one or more of any of several types of bus structures, including a memory bus or memory controller, a peripheral bus, an accelerated graphics port, and a processor or local bus using any of a variety of bus architectures.

Storage 920 is physical storage that includes one or both of memory 956 and storage device 990, which store operating system 912, application programs 914, and application data 916 according to any distribution. Non-removable memory 922 includes one or more of RAM (random access memory), ROM (read only memory), flash memory, a solid-state drive (SSD), a hard disk drive (e.g., a disk drive for reading from and writing to a hard disk), and/or other physical memory device type. Non-removable memory 922 may include main memory and may be separate from or fabricated in a same integrated circuit as processor 910. As shown in FIG. 9, non-removable memory 922 stores firmware 918, which may be present to provide low-level control of hardware. Examples of firmware 918 include BIOS (Basic Input/Output System, such as on personal computers) and boot firmware (e.g., on smart phones). Removable memory 924 may be inserted into a receptacle of or otherwise coupled to computing device 902 and can be removed by a user from computing device 902. Removable memory 924 can include any suitable removable memory device type, including an SD (Secure Digital) card, a Subscriber Identity Module (SIM) card, which is well known in GSM (Global System for Mobile Communications) communication systems, and/or other removable physical memory device type. One or more of storage device 990 may be present that are internal and/or external to a housing of computing device 902 and may or may not be removable. Examples of storage device 990 include a hard disk drive, a SSD, a thumb drive (e.g., a USB (Universal Serial Bus) flash drive), or other physical storage device.

One or more programs may be stored in storage 920. Such programs include operating system 912, one or more application programs 914, and other program modules and program data. Examples of such application programs may include, for example, computer program logic (e.g., computer program code/instructions) for implementing server infrastructure 102, field-specific database 104, model trainer 106, field-specific transformer model 108, database indexer 110, document(s) 112, embedding index 114, training dataset generator 202, transformer model trainer 204, document parser 206, index embedding storer 208, client 302, network 304, query processor 306, query parser 308, hybrid searcher 310, ranking model 312, results processor 314, keyword index 316, interface 318, and/or each of the components described therein, as well as any of flowcharts 400, 500, 600, 700, and/or 800, and/or any individual steps thereof.

Storage 920 also stores data used and/or generated by operating system 912 and application programs 914 as application data 916. Examples of application data 916 include web pages, text, images, tables, sound files, video data, and other data, which may also be sent to and/or received from one or more network servers or other devices via one or more wired or wireless networks. Storage 920 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

A user may enter commands and information into computing device 902 through one or more input devices 950 and may receive information from computing device 902 through one or more output devices 950. Input device(s) 950 may include one or more of touch screen 952, microphone 954, camera 956, physical keyboard 958 and/or trackball 940 and output device(s) 950 may include one or more of speaker 952 and display 954. Each of input device(s) 950 and output device(s) 950 may be integral to computing device 902 (e.g., built into a housing of computing device 902) or external to computing device 902 (e.g., communicatively coupled wired or wirelessly to computing device 902 via wired interface(s) 960 and/or wireless modem(s) 960). Further input devices 950 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices.

Some devices can serve more than one input/output function. For instance, display 954 may display information, as well as operating as touch screen 952 by receiving user commands and/or other information (e.g., by touch, finger gestures, virtual keyboard, etc.) as a user interface. Any number of each type of input device(s) 950 and output device(s) 950 may be present, including multiple microphones 954, multiple cameras 956, multiple speakers 952, and/or multiple displays 954.

One or more wireless modems 960 can be coupled to antenna(s) (not shown) of computing device 902 and can support two-way communications between processor 910 and devices external to computing device 902 through network 904, as would be understood to persons skilled in the relevant art(s). Wireless modem 960 is shown generically and can include a cellular modem 966 for communicating with one or more cellular networks, such as a GSM network for data and voice communications within a single cellular network, between cellular networks, or between the mobile device and a public switched telephone network (PSTN). Wireless modem 960 may also or alternatively include other radio-based modem types, such as a Bluetooth modem 964 (also referred to as a "Bluetooth device") and/or Wi-Fi modem 962 (also referred to as an "wireless adaptor"). Wi-Fi modem 962 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 964 is configured to communicate with another Bluetooth-capable device according to the Bluetooth short-range wireless technology standard(s) such as IEEE 802.15.1 and/or managed by the Bluetooth Special Interest Group (SIG).

Computing device 902 can further include power supply 962, LI receiver 964, accelerometer 966, and/or one or more wired interfaces 960. Example wired interfaces 960 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 960 of computing device 902 provide for wired connections between computing device 902 and network 904, or between computing device 902 and one or more devices/peripherals when such devices/peripherals are external to computing device 902 (e.g., a pointing device, display 954, speaker 952, camera 956, physical keyboard 958, etc.). Power supply 962 is configured to supply power to each of the components of computing device 902 and may receive power from a battery internal to computing device 902, and/or from a power cord plugged into a power port of computing device 902 (e.g., a USB port, an A/C power port). LI receiver 964 may be used for location determination of computing device 902 and may include a satellite navigation receiver such as a Global Positioning System (GPS) receiver or may include other type of location determiner configured to determine location of computing device 902 based on received information (e.g., using cell tower triangulation, etc.). Accelerometer 966 may be present to determine an orientation of computing device 902.

Note that the illustrated components of computing device 902 are not required or all-inclusive, and fewer or greater numbers of components may be present as would be recognized by one skilled in the art. For example, computing device 902 may also include one or more of a gyroscope, barometer, proximity sensor, ambient light sensor, digital compass, etc. Processor 910 and memory 956 may be co-located in a same semiconductor device package, such as being included together in an integrated circuit chip, FPGA, or system-on-chip (SOC), optionally along with further components of computing device 902.

In embodiments, computing device 902 is configured to implement any of the above-described features of flowcharts herein. Computer program logic for performing any of the operations, steps, and/or functions described herein may be stored in storage 920 and executed by processor 910.

In some embodiments, server infrastructure 970 may be present in computing environment 900 and may be communicatively coupled with computing device 902 via network 904. Server infrastructure 970, when present, may be a network-accessible server set (e.g., a cloud-based environment or platform). As shown in FIG. 9, server infrastructure 970 includes clusters 972. Each of clusters 972 may comprise a group of one or more compute nodes and/or a group of one or more storage nodes. For example, as shown in FIG. 9, cluster 972 includes nodes 974. Each of nodes 974 are accessible via network 904 (e.g., in a "cloud-based" embodiment) to build, deploy, and manage applications and services. Any of nodes 974 may be a storage node that comprises a plurality of physical storage disks, SSDs, and/or other physical storage devices that are accessible via network 904 and are configured to store data associated with the applications and services managed by nodes 974. For example, as shown in FIG. 9, nodes 974 may store application data 978.

Each of nodes 974 may, as a compute node, comprise one or more server computers, server systems, and/or computing devices. For instance, a node 974 may include one or more of the components of computing device 902 disclosed herein. Each of nodes 974 may be configured to execute one or more software applications (or "applications") and/or services and/or manage hardware resources (e.g., processors, memory, etc.), which may be utilized by users (e.g., customers) of the network-accessible server set. For example, as shown in FIG. 9, nodes 974 may operate application programs 976. In an implementation, a node of nodes 974 may operate or comprise one or more virtual machines, with each virtual machine emulating a system architecture (e.g., an operating system), in an isolated manner, upon which applications such as application programs 976 may be executed.

In an embodiment, one or more of clusters 972 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 972 may be a datacenter in a distributed collection of datacenters. In embodiments, exemplary computing environment 900 comprises part of a cloud-based platform.

In an embodiment, computing device 902 may access application programs 976 for execution in any manner, such as by a client application and/or a browser at computing device 902.

For purposes of network (e.g., cloud) backup and data security, computing device 902 may additionally and/or alternatively synchronize copies of application programs 914 and/or application data 916 to be stored at network-based server infrastructure 970 as application programs 976 and/or application data 978. For instance, operating system 912 and/or application programs 914 may include a file hosting service client configured to synchronize applications and/or data stored in storage 920 at network-based server infrastructure 970.

In some embodiments, on-premises servers 992 may be present in computing environment 900 and may be communicatively coupled with computing device 902 via network 904. On-premises servers 992, when present, are hosted within an organization's infrastructure and, in many cases, physically onsite of a facility of that organization. On-premises servers 992 are controlled, administered, and maintained by IT (Information Technology) personnel of the organization or an IT partner to the organization. Application data 998 may be shared by on-premises servers 992 between computing devices of the organization, including computing device 902 (when part of an organization) through a local network of the organization, and/or through further networks accessible to the organization (including the Internet). Furthermore, on-premises servers 992 may serve applications such as application programs 996 to the computing devices of the organization, including computing device 902. Accordingly, on-premises servers 992 may include storage 994 (which includes one or more physical storage devices such as storage disks and/or SSDs) for storage of application programs 996 and application data 998 and may include one or more processors for execution of application programs 996. Still further, computing device 902 may be configured to synchronize copies of application programs 914 and/or application data 916 for backup storage at on-premises servers 992 as application programs 996 and/or application data 998.

Embodiments described herein may be implemented in one or more of computing device 902, network-based server infrastructure 970, and on-premises servers 992. For example, in some embodiments, computing device 902 may be used to implement systems, clients, or devices, or components/subcomponents thereof, disclosed elsewhere herein. In other embodiments, a combination of computing device 902, network-based server infrastructure 970, and/or on-premises servers 992 may be used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 920. Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 914) may be stored in storage 920. Such computer programs may also be received via wired interface(s) 960 and/or wireless modem(s) 960 over network 904. Such computer programs, when executed or loaded by an application, enable computing device 902 to implement features of embodiments discussed herein. Accordingly, such computer programs represent controllers of the computing device 902.

Embodiments are also directed to computer program products comprising computer code or instructions stored on any computer-readable medium or computer-readable storage medium. Such computer program products include the physical storage of storage 920 as well as further physical storage types.

IV. CONCLUSION

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Furthermore, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

While various embodiments of the present disclosure have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for indexing a database comprising:
   accessing a field-specific database comprising a plurality of documents;
   determining a first document and a second document that are relevant to each other;
   determining training dataset comprising a first training pair, the first training pair determined by pairing a first portion of the first document with a corresponding second portion of the second document;
   generating a field-specific sentence transformer model based on the training dataset;
   receiving a search query directed to the field-specific database;
   providing the search query to the field-specific sentence transformer;
   receiving, from the field-specific sentence transformer, a query embedding vector representative of the search query;
   determining a nearest distance of a nearest index embedding vector of the plurality of index embedding vectors having the shortest distance to the query embedding vector;
   determining a first set of candidate documents, each candidate document associated with an index embedding vector of a plurality of index embedding vectors having a distance to the query embedding vector that satisfies a predetermined relationship with the nearest distance; and
   providing search results determined based at least on the first set of candidate documents.

2. The method of claim 1, further comprising:
   determining a second set of candidate documents based on a keyword search on the field-specific database using the search query;
   combining the first set of candidate documents and the second set of candidate documents into a ranked result set; and
   providing, as the search results, at least a portion of the ranked result set.

3. The method of claim 2, wherein said combining the first set of candidate documents and the second set of candidate documents into a ranked result set comprises:
   providing, to a ranking model, the first set of candidate documents, confidence scores associated with the first set of candidate documents, the second set of candidate documents, and keyword search relevancy scores associated with the second set of candidate documents, the ranking model trained to determine an optimal ranking for candidate documents based on training data derived at least from user feedback to previous search results; and
   receiving, from the ranking model, the ranked result set.

4. The method of claim 1, wherein said generating a field-specific sentence transformer model comprises:
   concatenating a pooling layer and a dense layer to a pre-trained transformer model to form the field-specific sentence transformer model; and
   training the field-specific model based on the training dataset.

5. The method of claim 1, wherein the first portion of the first document and the second portion of the second document comprise:
   a title of the first document and a title of the second document; or
   an abstract of the first document and an abstract of the second document.

6. The method of claim 1, wherein said determining a first document and a second document that are relevant to each other comprises:
   determining that a first classification associated with the first document matches a second classification associated with the second document; and
   determining that the first document is cited by the second document.

7. The method of claim 6, wherein the first classification of the first document and the second classification of the second document comprise:

a patent classification;
a journal classification; or
an article classification.

8. The method of claim 1, further comprising:
providing, to the field-specific sentence transformer, the plurality of documents of the field-specific database;
receiving, from the field-specific sentence transformer, the plurality of index embedding vectors, each particular index embedding vector representative of a portion of the corresponding document of the plurality of documents used to generate the particular index embedding vector; and
indexing the field-specific database based on the plurality of index embedding vectors.

9. A system for indexing a database comprising:
a processor; and
a memory comprising program code structured to cause the processor to:
access a field-specific database comprising a plurality of documents;
determine a first document and a second document that are relevant to each other;
determine a training dataset comprising a first training pair, the first training pair determined by pairing a first portion of the first document with a corresponding second portion of the second document;
generate a field-specific sentence transformer model based on the training dataset;
receive a search query directed to the field-specific database;
provide the search query to the field-specific sentence transformer;
receive, from the field-specific sentence transformer, a query embedding vector representative of the search query;
determine a nearest distance of a nearest index embedding vector of the plurality of index embedding vectors having the shortest distance to the query embedding vector;
determine a first set of candidate documents, each candidate document associated with an index embedding vector of a plurality of index embedding vectors having a distance to the query embedding vector that satisfies a predetermined relationship with the nearest distance; and
provide search results determined based at least on the first set of candidate documents.

10. The system of claim 9, wherein, to provide the search results, the program code is structured to cause the processor to:
determine a second set of candidate documents based on a keyword search on the field-specific database using the search query;
combine the first set of candidate documents and the second set of candidate documents into a ranked result set; and
provide, as the search results, at least a portion of the ranked result set.

11. The system of claim 10, wherein to combine the first set of candidate documents and the second set of candidate documents into a ranked result set, the program code is structured to cause the processor to:
provide, to a ranking model, the first set of candidate documents, confidence scores associated with the first set of candidate documents, the second set of candidate documents, and keyword search relevancy scores associated with the second set of candidate documents, the ranking model trained to determine an optimal ranking for candidate documents based on training data derived at least from user feedback to previous search results; and
receive, from the ranking model, the ranked result set.

12. The system of claim 9, wherein to generate a field-specific sentence transformer model, the program code is structured to cause the processor to:
concatenate a pooling layer and a dense layer to a pre-trained transformer model to form the field-specific sentence transformer model; and
train the field-specific model based on the training dataset.

13. The system of claim 9, wherein, to determine a first document and a second document that are relevant to each other, the program code is structured to cause the processor to:
determine that a first classification associated with the first document matches a second classification associated with the second document; and
determine that the first document is cited by the second document.

14. The system of claim 13, wherein the first classification of the first document and the second classification of the second document comprise:
a patent classification;
a journal classification; or
an article classification.

15. The system of claim 9, wherein the program code is structured to further cause the processor to:
provide, to the field-specific sentence transformer, the plurality of documents of the field-specific database;
receive, from the field-specific sentence transformer, the plurality of index embedding vectors, each particular index embedding vector representative of a portion of the corresponding document of the plurality of documents used to generate the particular index embedding vector; and
index the field-specific database based on the plurality of index embedding vectors.

16. A computer-readable storage medium comprising computer-executable instructions that, when executed by a processor, cause the processor to:
access a field-specific database comprising a plurality of documents;
determine a first document and a second document that are relevant to each other;
determine a training dataset comprising a first training pair, the first training pair determined by pairing a first portion of the first document with a corresponding second portion of the second document;
generate a field-specific sentence transformer model based at least on the training dataset;
receive a search query directed to the field-specific database;
provide the search query to the field-specific sentence transformer;
receive, from the field-specific sentence transformer, a query embedding vector representative of the search query;
determine a nearest distance of a nearest index embedding vector of the plurality of index embedding vectors having the shortest distance to the query embedding vector;
determine a first set of candidate documents, each candidate document associated with an index embedding vector of a plurality of index embedding vectors having a distance to the query embedding vector that satisfies a predetermined relationship with the nearest distance; and provide search results determined based at least on the first set of candidate documents.

17. The computer-readable storage medium of claim 16, wherein, to determine a first document and a second document that are relevant to each other, the computer-executable instructions, when executed by the processor, cause the processor to:

determine that a first classification associated with the first document matches a second classification associated with the second document; and determine that the first document is cited by the second document.

18. The computer-readable storage medium of claim 16, wherein, to provide the search results, the computer-executable instructions, when executed by the processor, cause the processor to:

determine a second set of candidate documents based on a keyword search on the field-specific database using the search query;

combine the first set of candidate documents and the second set of candidate documents into a ranked result set; and provide, as the search results, at least a portion of the ranked result set.

19. The computer-readable storage medium of claim 18, wherein, to combine the first set of candidate documents and the second set of candidate documents into a ranked result set, the computer-executable instructions, when executed by the processor, cause the processor to:

provide, to a ranking model, the first set of candidate documents, confidence scores associated with the first set of candidate documents, the second set of candidate documents, and keyword search relevancy scores associated with the second set of candidate documents, the ranking model trained to determine an optimal ranking for candidate documents based on training data derived at least from user feedback to previous search results; and receive, from the ranking model, the ranked result set.

20. The computer-readable storage medium of claim 16, wherein, to generate a field-specific sentence transformer model, the computer-executable instructions, when executed by the processor, cause the processor to:

concatenate a pooling layer and a dense layer to a pre-trained transformer model to form the field-specific sentence transformer model; and train the field-specific model based on the training dataset.

* * * * *